United States Patent [19]

Eiermann

[11] Patent Number: 4,779,578
[45] Date of Patent: Oct. 25, 1988

[54] FLUID-COOLED HOUSING OF A ROTARY PISTON INTERNAL COMBUSTION ENGINE

[75] Inventor: Dankwart Eiermann, Weissensberg, Fed. Rep. of Germany

[73] Assignee: Wankel GmbH, Berlin, Fed. Rep. of Germany

[21] Appl. No.: 944,807

[22] Filed: Dec. 19, 1986

[51] Int. Cl.$^4$ ............................ F02B 75/18; F02F 1/14
[52] U.S. Cl. .............................. 123/41.79; 123/41.28; 418/83
[58] Field of Search ................. 418/83, 60; 123/41.28, 123/41.74, 41.29, 41.79

[56] References Cited

U.S. PATENT DOCUMENTS

| | | | |
|---|---|---|---|
| 1,680,567 | 8/1928 | Pitzman | 123/41.28 |
| 3,895,889 | 7/1975 | Loyd, Jr. et al. | 418/83 |
| 4,125,347 | 11/1978 | Kakui | 418/83 |
| 4,601,265 | 7/1986 | Wells et al. | 123/41.28 |
| 4,664,607 | 5/1987 | Jones | 418/83 |

FOREIGN PATENT DOCUMENTS

| | | | |
|---|---|---|---|
| 69589 | 2/1915 | Austria | 123/41.79 |
| 309046 | 11/1918 | Fed. Rep. of Germany | 123/41.79 |

Primary Examiner—Tony M. Argenbright
Assistant Examiner—Eric R. Carlberg
Attorney, Agent, or Firm—Becker & Becker, Inc.

[57] ABSTRACT

A liquid or fluid cooled housing of a rotary piston internal combustion engine of trochoidal type of construction consisting of side parts and a dual-arc housing inner surfacing and having an eccentric shaft passing through the side parts. A triangular piston rotates upon an eccentric mounted on the eccentric shaft and corners of the triangular piston are in sliding engagement along the housing inner surfacing. A connection tube is provided supplying cooling medium into the individual housing sections. A series connection of the cooling medium circulation is produced between a first side part in direction of cooling medium flow and a first housing part as well as between a center part and a second housing part respectively having a closure disc installed therewith. Perforations are provided for pressure equalization in the closure discs. For production of a parallel connection of cooling medium circulation between a first side disc in a direction of cooling medium flow and a first housing part there is installed a shutter and further shutters are provided between the first housing part and a center part as well as between the center part and a second housing part in flow direction and between a second housing part and a second side part. Parts are interchangeable irrespective of series and parallel cooling medium circulation. A by-pass for cooling of an eccentric shaft and eccentric bearings thereof branches off independently of series or parallel connection of the cooling medium circulation.

7 Claims, 3 Drawing Sheets

FLUID-COOLED HOUSING OF A ROTARY PISTON INTERNAL COMBUSTION ENGINE

BACKGROUND OF THE INVENTION

Field of the Invention

The present invention concerns the housing of a rotary piston internal combustion engine of trochoidal type of construction, which consists of side parts or plates and are a dual-arc or curved inner surfacing and having an eccentric shaft passing through the side parts. An angular piston rotates upon an eccentric of the eccentric shaft and this piston is in sliding engagement along the inner surfacing of the housing. The invention concerns especially the multi-disc rotary piston internal combustion engine of the same type of construction with which accompanying parts are installed among or centrally between the individual housing parts and piston means.

Such housings have hollowed chambers in housing or casing surface runways or internal surfaces, side parts and housing parts respectively side plates and cooling fluid flows through these hollow chambers. With that, via position and through-flow widths of these hollow chambers there can be taken into account heat and cooling requirements of individual machine parts such as the sealing system or the bearings encountered during operation of the rotary piston internal combustion engine. Accordingly, the cooling chambers are located essentially in the region of the hot arc or curve and the cooling chambers here have the object to cool not only the combustion chamber walls, but rather primarily most of all to cool the pistons and the sealing parts thereof. Accordingly a natural requirement exists at all piston side walls, from which primarily most of all the heat should be dissipated, to attain equal temperatures.

The cooling system must be attuned, adjusted and adapted respectively to the use, application or employment objectives and purposes. With stationary types, which operate or run with uniform load without load peaks and consequently can be operated with reduced cooling, a series connection of the cooling fluid paths or conduits is appropriate, expedient, practical and useful. The temperature adjusts itself in operation to a level within a range of 2° C. to 3° C. between the beginning and end of the cooling medium circulation. When referring to series connection there is to be understood that for example with a two-disc machine that the cooling medium first coming from the heat exchanger is conveyed through the first side disc or plate, then through the adjoining first mantel or housing part, and from there through the center or middle part and from there through the second mantel or housing part and finally through the second side disc and from there back to the heat exchanger or so long as the operating temperature has not yet been attained for the cooling medium circulation being conveyed or circulated along the mentioned path in a closed circuit or circulation.

With vehicular and aircraft motors or engines with which very variable loading would be encountered with suddenly ocurring peaks, overheating would arise and be encountered with the described type of cooling. Here, there cannot be advocated any attempt to try to supply the individual housing sections sequentially with cooling medium, since then in the subsequently connected locations there would be encountered and there would arise temperatures that are too high. For this reason, a parallel connection of the individual housing sections is appropriate, expedient, practical and useful, so that each individual segment or section of the housing has cooling medium flowing therethrough directly and flowing immediately from the heat exchanger, to the extent that with a temperature that is too low there is not produced a closed circulation after closure of intermediate connected thermostats between the housing cooling chambers and heat exchanger.

Series connections respectively parallel connections of the cooling medium circulation require respectively an isolated housing construction. With multi-purpose motors or constructions for large series production or manufacturing, which are arranged both for stationary motors as well as for such very variable performance graph situations, there is however necessary to have available an arrangement of the housing cooling paths, which can be modified for one purpose or another purpose via simple and straightforward measures without change of any construction itself and without modifying or varying the housing construction itself.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

An object of the present invention is to provide an arrangement of a housing cooling path made available for stationary motors as well as for very variable performance graph situations without requiring any change of construction itself although attaining the object via straightforward features which can be modified to fulfill one or another application or purpose.

According to the present invention consequently there is available a housing with which via selective installation of closure discs or of baffles, shutters, shields, diaphragms, slits or orifices in nozzles in a connection tube supplying cooling medium to the housing sections or segments to obtain either a parallel connection or a series connection of the cooling medium circulation.

The housing construction as such is unaffected in any way thereby, also the installation milling or cutting for the closure discs respectively for the baffles, shutters and the like can be the same so that respectively during the assembly only the one or the other thereof need to be installed. At the same, the baffle or shutter openings moreover can be adapted in the diameter thereof to the respective cooling requirements and respectively also can be exchanged. The present invention accordingly especially with larger series production or manufacture can bring about very considerable savings and easing, relief and alleviation since only a single model of the housing is required for the differing and most varying types of machines.

DESCRIPTION OF PREFERRED EMBODIMENTS

Figure 1:
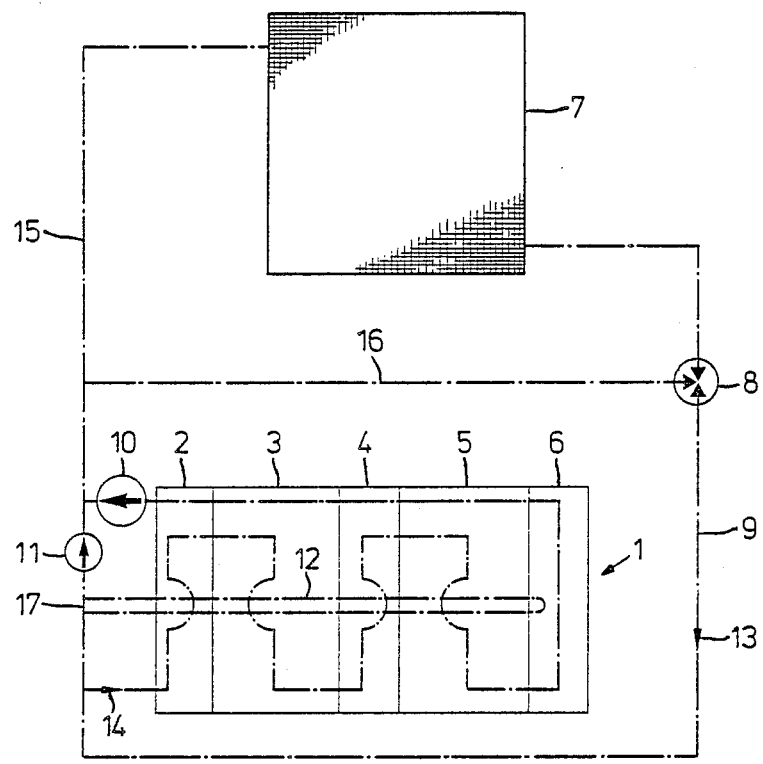
FIG. 1 is a view that shows a schematic diagram for a series connection of the housing cooling medium circulation or circuit.

Referring now to the drawings in detail, with the circuit diagram or hook-up plan illustrated in FIG. 1, there is provided a housing 1 of a rotary piston internal combustion engine; this housing 1 consists of individual housing sections or segments, whereby a first side part or plate 2, a first mantel or housing part 3, a center or middle part 4, a second mantel or housing part 5 and a second side part or plate 6 can be found illustrated in FIG. 1. Also shown is a heat exchanger 7. A thermostat 8 is provided which surrounds or completes the cooling medium circuit or circulation 9 from heat exchanger 7, so long as the operating temperature has not yet been attained. A revolving or circulating pump 10 is provided for the housing circuit for circulation of the cooling medium and a smaller revolving or circulating pump 11 is provided for a by-pass 12 leading through a hollow shaft.

The cooling medium flows in a direction of the parts 13 and 14 initially through the first side part 2 upwardly in the drawing and from there through the first mantel or housing part 3 downwardly in the drawing, and further through the remaining housing sections or segments 4 through 6 and from a side part 6 to the revolving or circulating pump 10, via which the cooling medium is conveyed back to the heat exchanger 7 respectively via the line or conduit 16 to the thermostat 8. The by-pass 12 for the eccentric shafts and the eccentric bearing cooling branches at 17 from the cooling medium circuit or circulation 9. The cooling medium flowing through the shaft is returned into the circuit or circulation 9 by the revolving or circulation pump 11. Accordingly, a series connection exists with which the individual housing sections or segments have flow of cooling medium therethrough sequentially or one after another, which is applicable, expedient and useful with machines having uniform loading.

Figure 2:
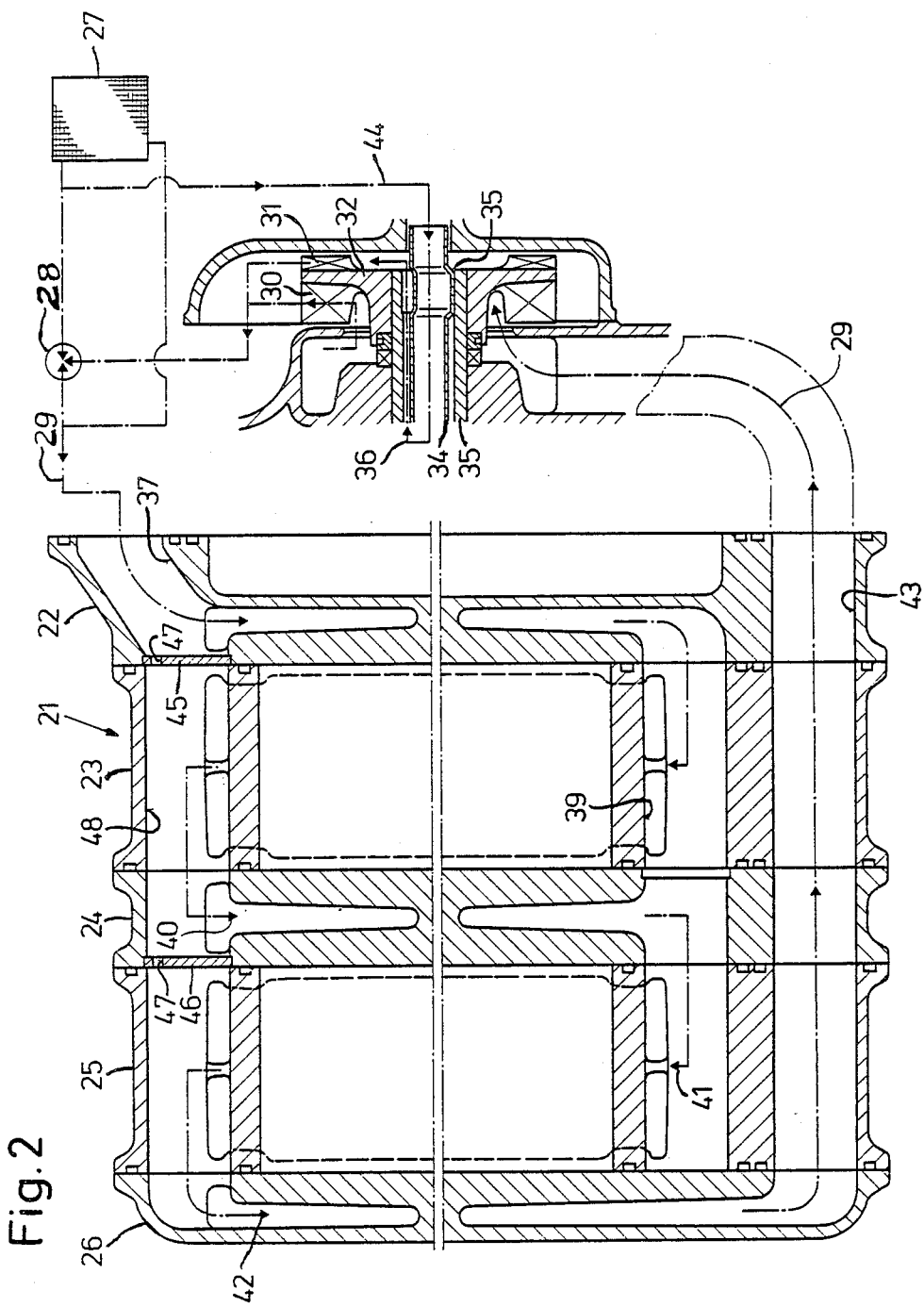
FIG. 2 is a view that shows a radial section through a housing of an inventive rotary piston internal combustion engine with a series connection corresponding to the view of FIG. 1.

FIG. 2 illustrates in detail this type of circuit or circulation with a housing having a two-disc rotary piston engine. The housing sections or segments are shown to include the right side part 22, the right mantel or housing part 23, the center or middle part 24, the left mantel or housing part 25 and the left side part 26. A heat exchanger 27 is schematically illustrated and also shown are thermostat 28, housing cooling medium circuit or circulation 29, large vane blades 30 and small vane blades 31 of a revolving or circulating pump 32 which is fastened upon an end of an only partially illustrated eccentric shaft 33 and the pump 32 rotates with this eccentric shaft 33. The eccentric shaft is made hollow in construction. A supply or feed tube 34 with spacers 35 arranged rigidly and in such a manner in the illustrated end of the eccentric shaft 33 that an annular spacer chamber 36 remains open between the tubular-shaped end of the eccentric shaft 33 and the supply tube 34.

The cooling medium circuit or circulation 29 enters into the right side part 22 at the cooling medium inlet opening 37 of the housing 1 and the cooling medium flows and passes through the hollow chamber 38 thereof from above to below in order to overflow or go over at the underside of the side part 22 into the hollow chambers 39 of the right center or middle part 23 and subsequently the center or middle part 24, the left mantel or housing part 25 and the left side part 26 in the same manner of through flow in a direction of arrows 40, 41, 42. The cooling medium flows from an underside of the left side part 26 through a return tube or pipe 46 passing through all housing sections or segments 22 through 26 respectively to the large vane blades 30 of the revolving or circulating pump 32 and from there to the thermostat 28. The by-pass line or conduit for the cooling of the eccentric shaft 34 is conveyed at 44 by the line or conduit between the heat exchanger 27 and thermostat 28 to the supply tube 34 and from a left end thereof not illustrated through a hollow space or chamber of the eccentric shaft 33 through the circular or annular spacer chamber 36 to the small vane blades 31 of the revolving or circulating pump 32 and from there into the general or common cooling medium circuit or circulation 29.

A closure disc 45 provided between a right side part 22 and a right mantel or housing part 23 as well as a closure disc 46 just like that of closure disc 45 can be provided between the center or middle part 24 and the left mantel or housing part 25; each of the two closure discs 45, 46 has a small opening or breakthrough or perforation means 47 for pressure equalization. The closure discs 45, 46 close or block off a connection tube 48 for the supply of cooling medium and force the cooling medium circulation into the series connection illustrated and represented schematically in FIG. 1.

Figure 3:
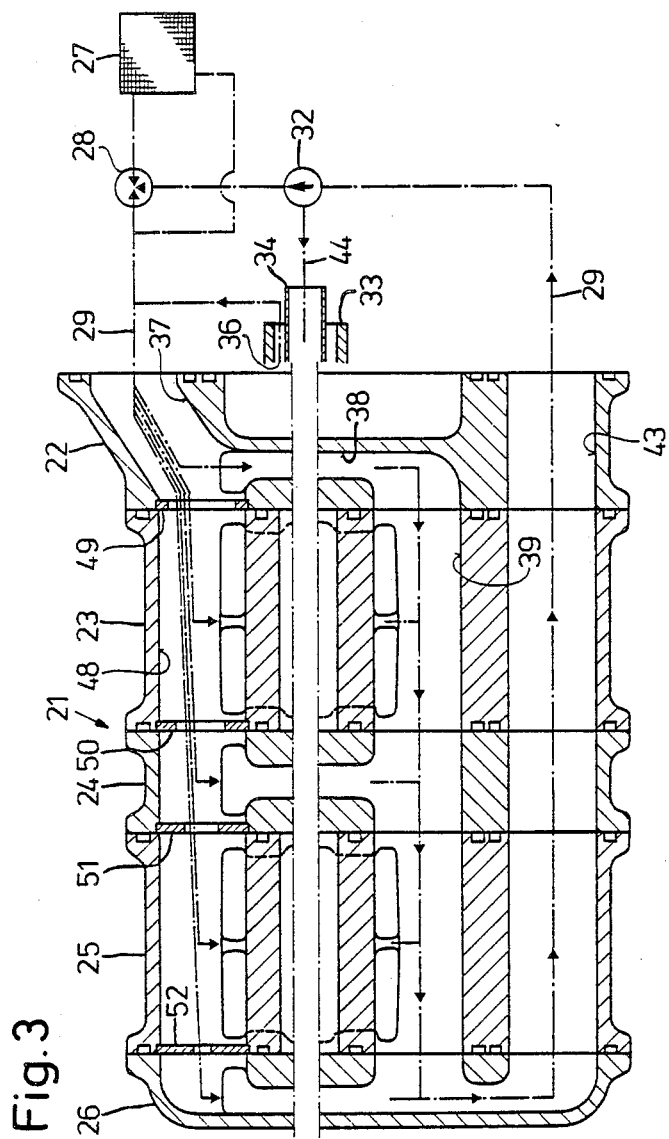
FIG. 3 is a view taken in a vertical, shortened radial section through the same machine, although with parallel connection of the housing cooling medium circulation or circuit.

This connection tube 48 with the completely identical housing illustrated in FIG. 3 and otherwise illustrated in FIG. 2 is continuously open through all housing sections or segments 22 through 26 respectively. The cooling medium accordingly can flow to all housing sections or segments 22 through 26 inclusive directly and simultaneously from above in a parallel connection. A baffle, shutter or diaphragm 49 with a large opening in this connection tube 48 however between the right side part 22 and the right mantel or housing part 23 can be provided and a baffle or shutter 50 can be provided at the transitions or crossing transfer locations between the right mantel or housing part 23 and the center or middle part 24 and a baffle or shutter 51 can be provided from the center or middle part 24 to the left mantel or housing part 25 and a baffle or shutter 52 can be provided with openings becoming respectively smaller at the transition or crossingover from the left mantel or housing part 25 to the left side part 26; these baffles or shutters regulate and control the access as to supply with respect to the individual housing sections or segments 22 through 26 respectively in order to force a uniform through-flow of cooling medium in all of these housing sections or segments. The return of the cooling medium occurs from all housing sections or segments 22 through 26 respectively via the return pipe or tube 43 as illustrated and described with the embodiment of FIG. 2.

The housing means 21 illustrated in the two illustrations of FIGS. 2 and 3 accordingly are completely identical except for the compartmentalization of the connection pipe or tube 48 through the closure discs 45 and 46 respectively the baffles or shutters 49, 50, 51 and 52 and also being exchangable among each other as to the individual parts involved therewith. Via insertion or installation of the closure discs 45, 46 respectively the baffles or shutters 49, 50, 51, 52 there is noted that cooling medium circulation can be conveyed parallel or in series through the housing 21. A by-pass line or conduit can be branched-off and returned in the same manner in both situations. There is to be considered to be included in the scope of the present invention a situation when a conventional uncooled shaft is inserted or installed in the housing and by-pass cooling is eliminated and not required.

The present invention is, of course, in no way restricted to the specific disclosure of the specification and drawings, but also encompasses any modifications within the scope of the appended claims.

What I claim is:

1. A fluid-cooled housing of a rotary piston internal combustion engine of trochoidal type of construction, which consists of side parts and a dual-curved inner housing surfacing and having an eccentric shaft passing through the side parts as well as having an eccentric on the eccentric shaft and a triangular piston rotating upon the eccentric with corners of the piston in sliding engagement along the inner housing surfacing, said housing comprising: a connection tube leading to individual housing sections wherein cooling medium is supplied thereto; and means with different opening widths including closure discs, baffles, shutters and the like insertable selectively between individual housing sections which remain the same although said means with different opening widths are interchangeable during employment thereof switchable for series as well as parallel connection of cooling medium circulation respectively in standardized housing sections.

2. A housing according to claim 1 comprising a first side part, a first housing part as well as a central middle part and a second housing part including means defining a cooling medium circulation in a direction of cooling medium flow; and a closure disc respectively installed for production of a series connection of the cooling medium circulation between said first side part in the direction of cooling medium flow and the second housing part as well as between said central middle part and second housing part respectively.

3. A housing according to claim 2 comprising a perforation means for pressure equalization and located in said closure discs.

4. A housing according to claim 1 comprising: a shutter between a first side disc in direction of cooling medium flow and a first housing part for production of a parallel connection of cooling medium circulation, and shutter means respectively provided between the first housing part and a central middle part as well as between the central middle part and a second housing part in flow direction and between a second housing part and a second side part, whereby shutter opening of shutter means respectively following in flow direction is smaller than that of a preceding shutter means.

5. A housing according to claim 1 wherein said closure discs and shutter means respectively have identical measurements and installation profile shapes respectively screw couplings therewith.

6. A housing according to claim 5 wherein said closure discs and shutter means respectively are round flat discs respectively flat rings, and groove-like recess bores are provided in connection surfaces of the housing sections, into which said closure discs respectively said shutter means can be installed.

7. A housing according to claim 1 comprising a by-pass means including a conduit for cooling of an eccentric shaft and eccentric bearings thereof branched-off independently of series- as well as parallel-connection of cooling medium circulation thereof.

* * * * *

UNITED STATES PATENT AND TRADEMARK OFFICE
CERTIFICATE OF CORRECTION

PATENT NO. : 4,779,578

DATED : October 25, 1988

INVENTOR(S) : Dankwart Eiermann

It is certified that error appears in the above-identified patent and that said Letters Patent is hereby corrected as shown below:

On the Title Page, the following should be added:

[30] Foreign Application Priority Data

December 23, 1985 [DE] Fed. Rep. of Germany..3545821

Signed and Sealed this

Eighth Day of May, 1990

Attest:

HARRY F. MANBECK, JR.

*Attesting Officer*　　　　*Commissioner of Patents and Trademarks*